United States Patent
Tinnen et al.

(10) Patent No.: US 11,722,228 B2
(45) Date of Patent: Aug. 8, 2023

(54) WIRELESS COMMUNICATION

(71) Applicant: Tendeka B.V., Aberdeen (GB)

(72) Inventors: Bard Tinnen, Stavanger (NO); Havar Sortveit, Hommersak (NO)

(73) Assignee: TENDEKA B.V., Aberdeen (GB)

( * ) Notice: Subject to any disclaimer, the term of this patent is extended or adjusted under 35 U.S.C. 154(b) by 0 days.

(21) Appl. No.: 14/377,377

(22) PCT Filed: Feb. 20, 2013

(86) PCT No.: PCT/GB2013/050403
§ 371 (c)(1),
(2) Date: Aug. 7, 2014

(87) PCT Pub. No.: WO2013/124645
PCT Pub. Date: Aug. 29, 2013

(65) Prior Publication Data
US 2015/0009039 A1  Jan. 8, 2015

(30) Foreign Application Priority Data

Feb. 21, 2012 (GB) .................................. 1202923

(51) Int. Cl.
*E21B 47/18* (2012.01)
*H04B 13/02* (2006.01)
(Continued)

(52) U.S. Cl.
CPC ............ *H04B 13/02* (2013.01); *E21B 43/12* (2013.01); *E21B 47/18* (2013.01); *H04B 11/00* (2013.01)

(58) Field of Classification Search
CPC ........ E21B 47/12; E21B 47/18; E21B 47/182; E21B 47/185; E21B 47/187
See application file for complete search history.

(56) References Cited

U.S. PATENT DOCUMENTS 3,065,416 A * 11/1962 Jeter ........................ E21B 4/02
175/40
3,321,965 A * 5/1967 Johnson .................. E21B 47/06
73/152.37
(Continued)

FOREIGN PATENT DOCUMENTS

CA      2760062 A1   10/2010
EP      0916807 A2    5/1999
(Continued)

OTHER PUBLICATIONS

International Search Report PCT/ISA/210 for International Application No. PCT/GB2013/050403 dated Jun. 17, 2013.
(Continued)

*Primary Examiner* — Hai Phan
*Assistant Examiner* — Son M Tang
(74) *Attorney, Agent, or Firm* — Harness, Dickey & Pierce, P.L.C.

(57) ABSTRACT

A method for use in controlling pressure based signal transmission within a fluid in a flowline includes transmitting a pressure based signal through a fluid within a flowline using a flow control device, recognising a condition change associated with the flowline, and then controlling the flow control device in accordance with the condition change. Another method, or an associated method for use in communication within a flowline includes determining or composing an optimised pressure based signal for detection at a remote location and then transmitting the optimised signal using a flow control device.

24 Claims, 10 Drawing Sheets

(51) Int. Cl.
*E21B 43/12* (2006.01)
*H04B 11/00* (2006.01)

(56) References Cited

U.S. PATENT DOCUMENTS

| | | | | |
|---|---|---|---|---|
| 3,823,773 A * | 7/1974 | Nutter | ............... | E21B 23/006 |
| | | | | 166/336 |
| 3,887,010 A * | 6/1975 | Sizer | ................ | E21B 34/16 |
| | | | | 166/369 |
| 3,897,822 A * | 8/1975 | Mott | ................ | E21B 34/10 |
| | | | | 166/72 |
| 4,161,215 A * | 7/1979 | Bourne, Jr. | ........... | E21B 34/066 |
| | | | | 166/53 |
| 4,405,021 A * | 9/1983 | Mumby | ................ | E21B 21/103 |
| | | | | 175/48 |
| 4,515,225 A * | 5/1985 | Dailey | ................ | E21B 4/00 |
| | | | | 175/40 |
| 4,550,392 A * | 10/1985 | Mumby | ................ | E21B 47/187 |
| | | | | 175/45 |
| 4,630,244 A | 12/1986 | Larronde | | |
| 4,774,694 A * | 9/1988 | Moll | ................ | E21B 47/18 |
| | | | | 175/48 |
| 4,825,421 A * | 4/1989 | Jeter | ................ | E21B 47/18 |
| | | | | 367/83 |
| 4,842,074 A * | 6/1989 | Hines | ................ | E21B 34/10 |
| | | | | 166/149 |
| 4,901,290 A * | 2/1990 | Feld | ................ | E21B 47/18 |
| | | | | 367/85 |
| 5,073,877 A * | 12/1991 | Jeter | ................ | E21B 47/18 |
| | | | | 367/84 |
| 5,150,333 A * | 9/1992 | Scherbatskoy | ..... | E21B 41/0085 |
| | | | | 367/43 |
| 5,176,164 A * | 1/1993 | Boyle | ................ | E21B 34/06 |
| | | | | 137/155 |
| 5,234,057 A * | 8/1993 | Schultz | ................ | E21B 34/066 |
| | | | | 166/264 |
| 5,279,363 A * | 1/1994 | Schultz | ................ | E21B 34/066 |
| | | | | 166/264 |
| 5,335,730 A * | 8/1994 | Cotham, III | ........... | E21B 34/16 |
| | | | | 166/374 |
| 5,586,084 A * | 12/1996 | Barron | ................ | G01V 1/52 |
| | | | | 181/102 |
| 5,597,042 A * | 1/1997 | Tubel | ................ | E21B 47/107 |
| | | | | 166/250.15 |
| 5,691,712 A | 11/1997 | Meek et al. | | |
| 5,706,896 A * | 1/1998 | Tubel | ................ | E21B 41/00 |
| | | | | 166/313 |
| 5,732,776 A * | 3/1998 | Tubel | ................ | E21B 47/12 |
| | | | | 166/250.15 |
| 5,823,262 A * | 10/1998 | Dutton | ................ | F04B 49/106 |
| | | | | 166/250.15 |
| 5,831,177 A * | 11/1998 | Waid | ................ | E21B 43/14 |
| | | | | 73/861.77 |
| 6,219,301 B1 | 4/2001 | Moriarty | | |
| 6,237,701 B1 * | 5/2001 | Kolle | ................ | E21B 7/18 |
| | | | | 175/1 |
| 6,330,913 B1 * | 12/2001 | Langseth | ............... | E21B 49/088 |
| | | | | 166/250.01 |
| 6,357,525 B1 * | 3/2002 | Langseth | ............... | E21B 49/088 |
| | | | | 166/266 |
| 6,364,015 B1 * | 4/2002 | Upchurch | ............... | E21B 43/26 |
| | | | | 166/250.1 |
| 6,388,577 B1 | 5/2002 | Carstensen | | |
| 6,469,637 B1 * | 10/2002 | Seyler | ................ | E21B 47/187 |
| | | | | 181/102 |
| 6,626,042 B2 * | 9/2003 | Havlena | ................ | G01F 1/34 |
| | | | | 367/81 |
| 6,714,138 B1 * | 3/2004 | Turner | ................ | E21B 47/18 |
| | | | | 340/854.3 |
| 6,845,563 B2 * | 1/2005 | Lewis | ................ | E21B 47/022 |
| | | | | 175/45 |
| 6,909,667 B2 * | 6/2005 | Shah | ................ | E21B 47/18 |
| | | | | 367/83 |
| 7,040,401 B1 * | 5/2006 | McCannon | ............. | F04B 47/12 |
| | | | | 166/70 |
| 7,139,219 B2 * | 11/2006 | Kolle | ................ | E21B 47/14 |
| | | | | 367/85 |
| 7,313,052 B2 * | 12/2007 | Fincher | ................ | E21B 47/12 |
| | | | | 340/853.2 |
| 7,417,920 B2 * | 8/2008 | Hahn | ................ | E21B 47/182 |
| | | | | 175/40 |
| 7,484,566 B2 * | 2/2009 | Tips | ................ | E21B 21/103 |
| | | | | 166/373 |
| 7,518,950 B2 * | 4/2009 | Treviranus | ............... | E21B 47/18 |
| | | | | 175/45 |
| 8,169,854 B2 * | 5/2012 | Godager | ............... | E21B 47/182 |
| | | | | 340/854.3 |
| 8,267,197 B2 * | 9/2012 | Fincher | ................ | E21B 21/103 |
| | | | | 175/25 |
| 8,319,657 B2 * | 11/2012 | Godager | ............... | G01V 11/002 |
| | | | | 340/854.6 |
| 8,474,548 B1 * | 7/2013 | Young | ................ | E21B 47/24 |
| | | | | 175/40 |
| 8,689,884 B2 * | 4/2014 | Young | ................ | E21B 47/187 |
| | | | | 166/320 |
| 8,880,349 B2 * | 11/2014 | Pillai | ................ | E21B 47/18 |
| | | | | 367/81 |
| 8,898,017 B2 * | 11/2014 | Kragas | ................ | E21B 43/12 |
| | | | | 702/11 |
| 9,103,180 B2 * | 8/2015 | Roders | ................ | E21B 21/103 |
| 9,133,708 B2 * | 9/2015 | Conn | ................ | E21B 47/18 |
| 9,309,762 B2 * | 4/2016 | MacDonald | ........... | E21B 47/187 |
| 10,001,573 B2 * | 6/2018 | Kusko | ................ | G01V 1/137 |
| 10,344,590 B1 * | 7/2019 | Young | ................ | E21B 47/022 |
| 2003/0000706 A1 | 1/2003 | Carstensen | | |
| 2003/0000707 A1 * | 1/2003 | Flowers | ................ | E21B 47/187 |
| | | | | 166/374 |
| 2003/0016164 A1 * | 1/2003 | Finke | ................ | E21B 47/185 |
| | | | | 342/83 |
| 2003/0047316 A1 * | 3/2003 | Bosley | ................ | E21B 43/123 |
| | | | | 166/372 |
| 2003/0075361 A1 * | 4/2003 | Terry | ................ | E21B 47/01 |
| | | | | 175/61 |
| 2004/0238184 A1 | 12/2004 | Carstensen | | |
| 2005/0090985 A1 * | 4/2005 | Goodman | ............... | E21B 47/18 |
| | | | | 702/6 |
| 2005/0098349 A1 * | 5/2005 | Krueger | ............... | B63B 21/502 |
| | | | | 175/25 |
| 2005/0168349 A1 * | 8/2005 | Huang | ................ | E21B 47/182 |
| | | | | 340/854.3 |
| 2006/0131030 A1 * | 6/2006 | Sheffield | ................ | E21B 34/06 |
| | | | | 166/374 |
| 2007/0050145 A1 * | 3/2007 | Zhan | ................ | E21B 49/088 |
| | | | | 702/6 |
| 2007/0056771 A1 * | 3/2007 | Gopalan | ................ | E21B 47/24 |
| | | | | 175/40 |
| 2007/0296606 A1 | 12/2007 | Godager | | |
| 2008/0053658 A1 * | 3/2008 | Wesson | ................ | E21B 43/114 |
| | | | | 166/297 |
| 2008/0163680 A1 * | 7/2008 | DiFoggio | ................ | E21B 49/10 |
| | | | | 73/152.27 |
| 2008/0185143 A1 * | 8/2008 | Winters | ................ | E21B 47/06 |
| | | | | 166/250.07 |
| 2008/0230221 A1 * | 9/2008 | Zafari | ................ | E21B 47/06 |
| | | | | 166/254.1 |
| 2008/0308270 A1 * | 12/2008 | Wilson | ................ | E21B 41/02 |
| | | | | 166/244.1 |
| 2009/0020293 A1 * | 1/2009 | Richards | ............... | E21B 34/066 |
| | | | | 166/381 |
| 2009/0276156 A1 * | 11/2009 | Kragas | ................ | E21B 43/12 |
| | | | | 702/6 |
| 2009/0296086 A1 * | 12/2009 | Appel | ................ | E21B 49/10 |
| | | | | 73/152.28 |
| 2010/0023269 A1 * | 1/2010 | Yusti | ................ | E21B 49/008 |
| | | | | 702/12 |
| 2010/0025111 A1 * | 2/2010 | Gearhart | ............... | E21B 47/18 |
| | | | | 175/48 |
| 2010/0170673 A1 * | 7/2010 | Krueger | ................ | E21B 21/10 |
| | | | | 166/250.15 |

(56) References Cited

U.S. PATENT DOCUMENTS

| | | | |
|---|---|---|---|
| 2010/0270464 A1* | 10/2010 | Kalb | E21B 47/102 250/269.1 |
| 2010/0294506 A1* | 11/2010 | Rodriguez | E21B 43/122 166/372 |
| 2010/0307828 A1* | 12/2010 | Hutin | E21B 47/18 175/56 |
| 2011/0094799 A1 | 4/2011 | Close | |
| 2011/0155368 A1* | 6/2011 | El-Khazindar | E21B 47/00 166/250.01 |
| 2011/0198076 A1* | 8/2011 | Villreal | E21B 21/08 166/250.01 |
| 2012/0003043 A1* | 1/2012 | Cawley | E21B 43/164 405/53 |
| 2012/0032560 A1* | 2/2012 | Ochoa | E21B 47/18 310/339 |
| 2012/0127829 A1* | 5/2012 | Sitka | E21B 47/185 367/83 |
| 2013/0025940 A1* | 1/2013 | Grimmer | E21B 21/08 175/48 |
| 2013/0234859 A1* | 9/2013 | Picioreanu | G01V 11/002 340/853.1 |
| 2014/0238658 A1* | 8/2014 | Wilson | E21B 34/16 166/53 |
| 2015/0300327 A1* | 10/2015 | Sweatman | E21B 43/25 60/641.2 |
| 2015/0345240 A1* | 12/2015 | Roders | G05D 7/0617 175/25 |
| 2018/0347312 A1* | 12/2018 | Green | E21B 49/08 |

FOREIGN PATENT DOCUMENTS

| | | |
|---|---|---|
| EP | 2 780 548 | 9/2014 |
| GB | 2501638 A | 10/2013 |
| WO | WO-01/94750 A1 | 12/2001 |
| WO | WO-2006041308 A2 | 4/2006 |
| WO | WO-2010/122516 A2 | 10/2010 |

OTHER PUBLICATIONS

Examination Report under Section 18(3) issued by the GB Intellectual Property Office dated Mar. 29, 2017 for GB Application No. 1202923.7.

Canadian Examination Report dated Aug. 16, 2019 in Canadian Application No. 2,864,983.

* cited by examiner

WIRELESS COMMUNICATION

FIELD OF THE INVENTION

The present invention relates to methods and apparatus associated with wireless communication within a flowline, and in particular, but not exclusively, to methods and apparatus associated with wireless communication within a wellbore flowline using pressure based signals.

BACKGROUND TO THE INVENTION

To optimise recovery, the oil industry depends on gathering data from wells and reservoirs. Such data forms the basis for nearly every decision with respect to the development and operation of an oil field, including where to locate new wells, maintenance programs and allocation/control of production.

In view of this need for data, many well applications are completed with permanently installed downhole instrumentation, such as pressure and temperature monitoring devices. Due to the generally harsh wellbore environment, permanent instrumentation has a limited lifetime and there is an expectancy of failure. Such failure leads to limited obtainable information from the reservoir and limited control possibilities. This may have a serious impact on the understanding and modelling of the reservoir and reduce the reservoir recovery factor.

Furthermore, known installations typically require electrical supply and communication lines running the length of the production tubular from the wellhead down to the downhole monitoring and/or control system, said lines normally being secured to the production tubular using tailored clamps. Fitting cables to the tubing is a time consuming activity that prolongs the installation time. During installation and use of equipment such as traditional downhole pressure and temperature sensors, the cables, clamps, splices, penetrators, connectors and the like may become exposed to well fluids and are natural failure nodes. If damage occurs, the worst-case scenario is that the entire length of tubing must be retrieved to replace a damaged cable. If the damaged equipment is repairable, a well service operation must be performed.

Other borehole devices, such as multiphase flow meters, sand detectors, valves, chokes, circulation devices and the like may also be installed as part of a permanent borehole completion, and where this is the case similar problems as described above apply.

Depending on the well conditions, the lifetime expectancy of permanently installed equipment may range from a few months to a few years, and as noted above should permanent equipment fail, the only remedy in most cases is to re-complete the well, meaning replacing the production tubular and associated systems. This operation entails high risk and cost and is generally very undesirable.

Retrofit downhole monitoring and/or control systems are desirable in the art for use in the event of failure or compromise in permanent monitoring systems, thus permitting the continuity of dataflow from the well to be regained/maintained. In addition to such retrofit solutions, there is a recognised desire for downhole monitoring and/or control systems that are easily installed, retrieved and maintained, in order to provide for a long-term monitoring and/or control functionality in harsh well conditions.

WO 2006/041308 describes autonomous systems for downhole data acquisition and wireless data transmission in a well, and wireless downhole control systems enabling remote wireless flow control of downhole production and/or injection zones in a well related to the production of hydrocarbons. Specifically, operation of a restricting valve element in the pipe flow can be used to send a wireless telegram in an oil or gas well, i.e. wireless signal transmission is achieved by transmitting pressure pulses via flowing fluid.

Autonomous downhole devices such as the systems described above may experience a range of changing parameters in the well. Examples of such include pressure changes, changes in fluid flow rate and changes in fluid composition. Such changing parameters may adversely affect the operation of a device, for example by presenting conditions which do not support appropriate detection/reception of transmitted signals without requiring modification or modulation of the autonomous downhole device. Furthermore, certain well operations may be such that transmission of signals is not supported, for example during periods of well shut-in and the like.

SUMMARY OF THE INVENTION

According to a first aspect of the present invention there is provided a method for use in controlling pressure based signal transmission within a fluid in a flowline, comprising:
transmitting a pressure based signal through a fluid within a flowline using a flow control device;
recognising a condition change associated with the flowline; and controlling the flow control device in accordance with the condition change.

The present invention may permit the flow control device to be appropriately controlled in accordance with changing conditions within the flowline. Such control may facilitate optimisation of signal transmission and/or use of the control device. The present invention may be beneficial in flowlines which are subject to changing conditions over time, such as flowlines associated with the production of hydrocarbons form subterranean reservoirs. For example, the flow control device may be initially configured for operation, for example optimum operation, relative to flowline conditions at the time of commissioning, wherein such conditions may change over the course of time. For example, reservoir and wellbore pressures will naturally reduce during prolonged hydrocarbon production. In accordance with the present invention such changes may be recognised and the flow control device controlled accordingly. Preferred or optimum operation may thus be maintained.

The method may be for use in controlling pressure based signal transmission within a flowing fluid in a flowline. In such an arrangement transmission of the signal may be permitted or supported by the fact that fluid is flowing. As such, the transmission mode may not be based on the generation of shockwaves within the fluid, but instead on the principle of modifying the pressure of the flowing fluid.

The flowline may comprise, form part of or be located within a wellbore, such as a wellbore associated with hydrocarbon production from a subterranean reservoir. In such an arrangement the method may relate to a method for use in controlling pressure based signal transmission within a fluid in a wellbore. The fluid may comprise a wellbore fluid. The fluid may comprise a production fluid, for example hydrocarbons, water or the like. The fluid may comprise an injection fluid, such as a chemical treatment, fracturing fluid, lost circulation fluid, well kill fluid or the like. The fluid may comprise a completion fluid. The signal may be transmitted to provide communication between downhole and surface locations and/or vice versa, for example. The signal may be transmitted to provide communication between different downhole locations.

The pressure based signal may be composed to transmit data, for example data associated with the fluid, flowline and/or adjacent regions or components. The pressure based signal may be composed to transmit data associated with pressure, temperature, fluid composition, flow rate, fluid density or the like. The pressure based signal may be composed to transmit data obtained from at least one sensor. The at least one sensor may be located within the flowline. The at least one sensor may be associated with, for example form part of, the flow control device. The method may comprise obtaining data to be transmitted, for example via one or more sensors, and using the flow control device to generate one or more signals within the fluid which is representative of such data. Reception of the signal and appropriate signal analysis may be used to extract the transmitted data.

The method may comprise regularly transmitting a signal through the fluid. For example, the method may comprise transmitting at defined intervals.

The control device may be configured to impart a signal within the fluid by presenting a variable restriction to flow. The method may comprise controlling the flow control device to vary a restriction to flow to generate a signal, typically a pressure variation, within the fluid. Accordingly, the signal may be generated as a function of the fluid flow. The flow control device may comprise a regulating member configured to vary a flow path. The regulating member may be configured to modify a flow area through one or more flow ports. The regulating member may be operated by a drive arrangement, such as a motor, piston or the like. The flow control device may comprise an onboard power supply, such as a battery power supply, a generator system or the like. The flow control device may be provided in accordance with the device disclosed in WO 2006/041308, the disclosure of which is incorporated herein by reference.

The pressure based signal may comprise at least one pressure variation imparted within the fluid by the flow control device. The pressure variation may be defined as a variation in pressure from a baseline flow condition. Such a baseline condition may include normal flowing conditions of the fluid. The pressure variation may define a pressure pulse within the fluid. The pressure based signal may comprise a plurality of temporally spaced pressure variations imparted into the fluid.

The pressure based signal may comprise or define at least one signal parameter. At least one parameter may comprise amplitude. The amplitude may comprise or be defined by a pressure differential or variation relative to baseline flow conditions, for example, conditions under which no signal is transmitted. At least one parameter may comprise a time duration of a pressure variation. Such a time duration may be defined as a pulse width. At least one parameter may comprise a time lapse between sequential pressure variations. Such a time lapse may be defined as a pulse separation.

Appropriate data may be embedded within the signal in accordance with one or more signal parameters. For example, appropriate data may be associated with an amplitude parameter, a pulse width parameter, a pulse separation parameter, for example. In some embodiments a pulse separation parameter may be associated with data, for example a digitised data format. In such an arrangement other parameters, such as amplitude and pulse width, may be selected to ensure detection by a receiver.

The method may comprise recognising a condition change associated with the flowline and then controlling the flow control device to modify the pressure based signal. For example, the method may comprise controlling the flow control device in accordance with a recognised condition change to optimise the pressure based signal. Such optimisation may be achieved in terms of creating and/or maintaining an optimum signal which permits appropriate detection of the signal by a receiver. For example, maintaining a uniform signal format irrespective of a condition change within the flowline may eventually result in the inability to detect the signal at a receiver. Signal optimisation may be achieved by controlling the flow control device to modify one or more parameters of the signal, such as amplitude, pulse width, pulse separation or the like.

The method may comprise controlling the flow control device in accordance with the condition change to facilitate efficient operation of the flow control device, for example efficient power usage.

The method may comprise recognising a condition change within the flowline and associating the condition change with the occurrence of an event. For example, the method may comprise recognising a flowline shut-in event, i.e., an event in which flow within the flowline is significantly reduced or is stopped. Such a flowline shut-in event may intentionally occur, for example to permit one or more operations to be performed within the flowline, or within or with equipment associated with the flowline. In embodiments where the flowline is associated with a wellbore, shut-in may be required to facilitate intervention operations, testing of wellbore pressure barriers, installation, testing and commissioning of equipment, recording data associated with the flowline during shut-in and the like.

The method may comprise recognising a flow rate variation and associating this with a flowline shut-in event.

The method may comprise recognising a pressure variation, such as a pressure increase within the flowline and associating this with a flowline shut-in event. The method may comprise recognising a pressure variation beyond, for example above a threshold value and associating this with a flowline shut-in event. The threshold value may comprise an absolute value, or a differential or deviation value relative to a baseline condition. The method may comprise recognising a pressure variation as a function of time and associating this with a shut-in event. For example, the method may comprise recognising a pressure variation within a specific time period. This may be associated with a rate of change of pressure. The method may comprise recognising the occurrence of a pressure variation, for example above a threshold value for a threshold or predetermined time period. For example, the method may comprise recognising a prolonged pressure variation beyond a threshold value. This arrangement may permit differentiation to be made between a shut-in event and other events in which a pressure variation is also present, albeit for a shorter period of time.

The method may comprise recognising a flow initiating event, i.e., an event in which flow within the flowline is initiated or is significantly increased. The flow control device may then be controlled in accordance with the event. The method may comprise recognising a flow rate variation and associating this with a flow initiating event.

The method may comprise recognising a pressure variation, such as a pressure decrease within the flowline and associating this with a flow initiating event. The method may comprise recognising a pressure variation as a function of time and associating this with a flow initiating event.

The method may comprise controlling the flow control device by altering the mode of operation of said device.

The method may comprise controlling the flow control device to cease signal transmission in response to a recognised condition change. The method may comprise ceasing signal transmission in the event of a recognised condition change which renders transmission difficult or impossible, such as low or no flow, for example during a flowline shut-in event. Accordingly, ceasing transmission during such conditions may facilitate energy efficient operation of the flow control device. The method may comprise controlling the flow control device to cease signal transmission in response to a recognised flowline shut-in event.

The method may comprise controlling the flow control device to reinitiate signal transmission in response to a recognised condition. The method may comprise reinitiating signal transmission following a period of ceased transmission. For example, the method may comprise reinitiating signal transmission upon recognition of a condition change which again supports signal transmission. The method may comprise controlling the flow control device to reinitiate signal transmission in response to a recognised flow initiating event.

The method may comprise controlling the flow control device to cease signal transmission, and collecting and storing data during the period of ceased transmission. Such data may be collected regularly. Such data may be associated with the flowline, such as pressure data, temperature data and the like. Such data may be representative of flowline data during a shut-in event. The method may comprise controlling the flow control device to reinitiate signal transmission and composing one or more signals to transmit at least a portion of the data stored during the period of ceased transmission.

The method may comprise controlling the flow control device by modifying operational parameters stored within the flow control device. For example, the flow control device may operate in accordance with specific algorithms or protocols, wherein such algorithms or protocols are modified in accordance with a recognised condition change within the flowline. The flow control device may comprise a parameter matrix, and the method may comprise modifying parameters, such as amplitude and pulse duration in accordance with a recognised condition change.

The method may comprise monitoring a condition associated with the flowline to provide for recognising a condition change. Monitoring may be achieved by use of one or more sensors. At least one sensor may be provided exclusively for such monitoring. At least one sensor may be provided for both data collection to be transmitted and monitoring. Monitoring may be achieved by use of, for example, a pressure sensor, temperature sensor, carbon/oxygen log sensor, vibration sensor, vortex shedding sensor, flow rate sensor or the like, or any suitable combination.

The method may comprise continuously monitoring a condition associated with the flowline. The method may comprise discontinuously monitoring a condition associated with the flowline, for example at a desired sampling rate.

The method may comprise recognising a pressure condition change.

The method may comprise recognising a temperature condition change.

The method may comprise recognising a flow rate condition change.

The method may comprise recognising a fluid composition condition change.

The method may comprise determining or composing an optimised signal for detection at a remote location, and transmitting said optimised signal using the flow control device. The method may comprise modifying the optimised signal in accordance with a recognised condition change.

The method may comprise composing or determining an optimised signal in accordance with simulations, for example software simulations associated with the flowline.

The method may comprise composing or determining an optimised signal by transmitting one or more test signals.

The method may comprise:
transmitting a plurality of pressure based test signals;
receiving at least one test signal at a receiver;
determining or selecting an optimal signal from the at least one received test signal; and
transmitting a determined or selected optimal pressure based signal through the fluid within the flowline.

The method may comprise receiving a plurality of test signals at the receiver and determining or selecting an optimal signal from the plurality of received test signals.

Two or more test signals may be composed with at least one different signal parameter, such as amplitude, pulse width, pulse separation or the like.

The method may comprise communicating a positive determination of an optimal signal from the receiver to the flow control device. This may permit the flow control device to transmit a signal in accordance with the determined optimal signal. Communicating a positive determination may be achieved by wireless transmission of a signal, such as a pressure based signal, for example the determined optimal signal. Communicating a positive determination may be achieved by performance or initiation of a recognisable event within the flowline, such as a shut-in event.

According to a second aspect of the present invention there is provided a communication apparatus for communication within a flowline, comprising:
a flow control device configured for transmitting a pressure based signal through a fluid within a flowline;
a monitoring system for monitoring at least one condition associated with the flowline; and
a controller configured to control the flow control device in accordance with a condition change recognised by the monitoring system.

The apparatus may be configured to perform the method according to the first aspect. Various features associated with the first aspect may be applied to the second aspect.

The apparatus may comprise a receiver which is posited remotely from the flow control device and which is configured for detection/reception of a transmitted signal.

According to a third aspect of the present invention there is provided a method of communicating within a flowline, comprising:
transmitting a pressure based signal through a fluid within a flowline using a flow control device; and
controlling the flow control device upon recognition of a condition change within the flowline.

According to a fourth aspect of the present invention there is provided a method for use in communication within a flowline, comprising:
determining or composing an optimised pressure based signal for detection at a remote location; and
transmitting said optimised signal using a flow control device.

The method may comprise composing or determining an optimised signal in accordance with simulations, for example software simulations associated with the flowline.

The method may comprise composing or determining an optimised signal by transmitting one or more test signals.

The method may comprise:

transmitting a plurality of pressure based test signals;
receiving at least one test signal at a receiver;
determining or selecting an optimal signal from the at least one received test signal; and
transmitting a determined or selected optimal pressure based signal through the fluid within the flowline.

The method may comprise receiving a plurality of test signals at the receiver and determining or selecting an optimal signal from the plurality of received test signals.

Two or more test signals may be composed with at least one different signal parameter, such as amplitude, pulse width, pulse separation or the like.

The method may comprise communicating a positive determination of an optimal signal from the receiver to the flow control device. This may permit the flow control device to transmit a signal in accordance with the determined optimal signal. Communicating a positive determination may be achieved by wireless transmission of a signal, such as a pressure based signal, for example the determined optimal signal. Communicating a positive determination may be achieved by performance or initiation of a recognisable event within the flowline, such as a shut-in event.

Various different aspects have been defined above. It should be understood that various features of one aspect may be applied, in isolation or in any suitable combination, to any other aspect.

BRIEF DESCRIPTION OF THE DRAWINGS

These and other aspects of the present invention will now be described, by way of example only, with reference to the accompanying drawings, in which:

FIG. 7 illustrates a typical pressure build-up curve of a well during shut-in;

DETAILED DESCRIPTION OF THE DRAWINGS

Figure 1:
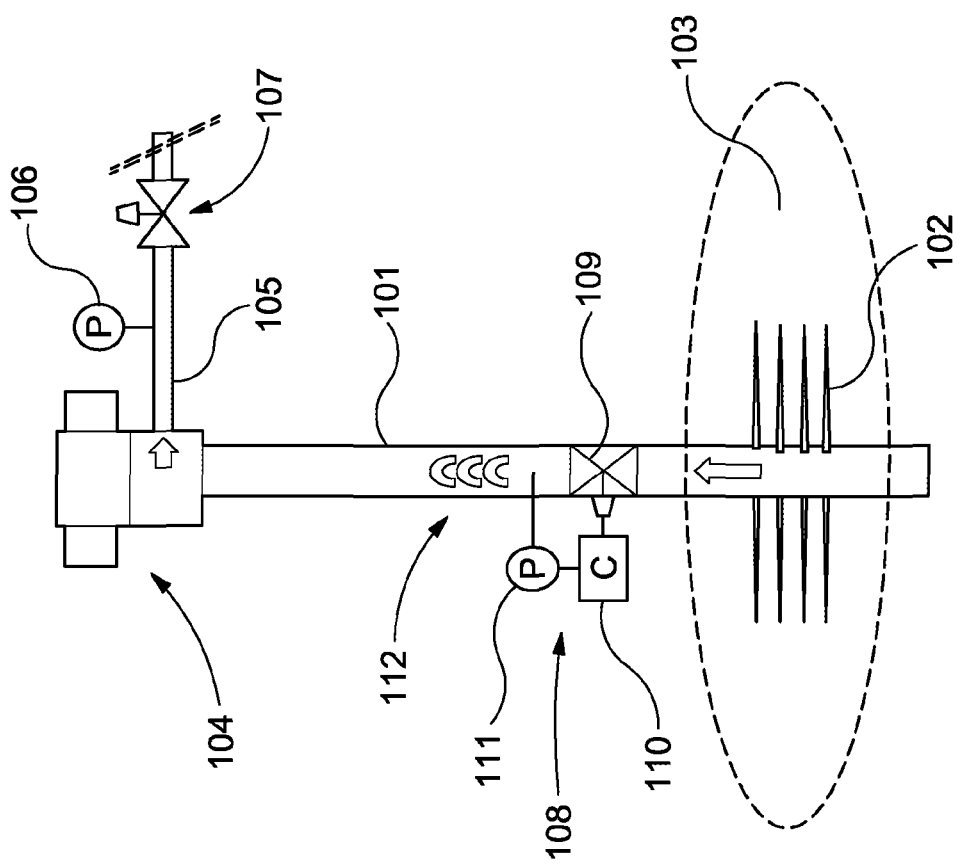
FIG. 1 is a diagrammatic illustration of a wellbore arrangement subject to wireless communication of signals in accordance with an embodiment of the present invention.

Aspects and embodiments of the present invention relate to methods and apparatus for use in communicating wirelessly within a wellbore, such as wellbore 101 shown in FIG. 1 which facilitates production of hydrocarbons such as oil and/or gas from a subterranean reservoir 103 via a set of perforations 102. Somewhere on the surface of the earth the wellbore 101 is terminated in a wellhead 104 which includes appropriate valves and monitoring systems to control and operate the well in accordance with relevant procedures and legislation. Downstream of the wellhead 104 the produced hydrocarbons flow through a flowline 105 to a production facility such as a separator and tank facility (not shown).

Oil or gas fields typically comprise numerous wells, of which most/all produce into the same processing facility. As wells may be of uneven pressure, for example due to penetrating different sections of the reservoir 103 or different reservoir units, regulation is required on surface to ensure that the production from each well arrives at the production facility at equal pressure. In order to provide for this, most flowlines 105 are equipped with a choke valve 107 in order to regulate pressure. Further, most flowlines 105 and/or wellheads 104 are equipped with a pressure sensor 106 to monitor the wellhead pressure.

It is desirable to provide some form of communication within the wellbore, for example between downhole and surface locations. Such communications have been known to be provided by dedicated wires and cables which extend along the entire communication path. However, such wired communication may be subject to failure within the wellbore environment. Forms of wireless communication are therefore of interest in the art.

In the present embodiment a flow control device or system 108 is located at a downhole location and functions to control the flow within the wellbore, for example production flow, to apply pressure based signals 112 through the well fluid to provide wireless communication between the surface and downhole location. As will be described in more detail below, embodiments of the present invention permit control over the pressure based signal transmission by recognising a condition change associated with the wellbore and then controlling the device 108 in accordance with the condition change.

The device 108 can be used to monitor and/or control the well. For downhole data monitoring purposes, the device 108 uses one or more sensors. A sensor suite 111 is provided, which for illustrative purposes may include a pressure sensor, defined by the letter "P". Other sensors, such as temperature sensors, flow rate sensors, composition sensors and the like may alternatively or additionally be provided. A control module 110 is used to record and process data obtained by the sensor suite 111. The device 108 comprises a choke/flow regulator valve or assembly 109 which is used to intelligently impose pressure variations 112 on the flowing production fluid in order to transmit the recorded data to surface. On surface, the pressure signals 112 are received by a sensor such as a pressure sensor 106 and an analysis system (not shown) is used to extract the downhole information.

Figure 2:
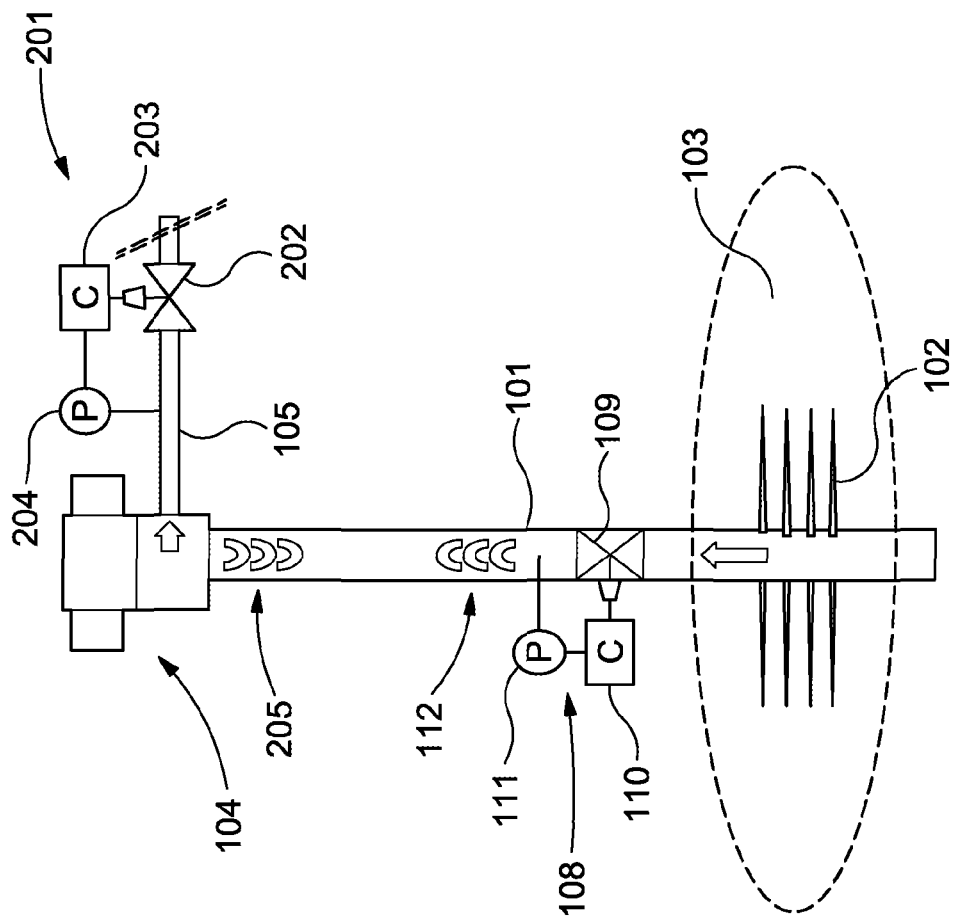
FIG. 2 is a diagrammatic illustration of a modified wellbore arrangement which is also subject to wireless communication of signals in accordance with an embodiment of the present invention.

FIG. 2 illustrates a wellbore which is largely similar to that shown in FIG. 1, and as such like components share like reference numerals. However, the arrangement shown in FIG. 2 differs in that a flow control device or system 201, which is configured similarly to downhole device 108, is provided at the surface location (effectively replacing or modifying the choke 107 in FIG. 1) and which is used for receiving signals 112 transmitted from the downhole device 108 as well as transmitting pressure signals 205 to said downhole device 108, and or other remote locations.

Figure 3:
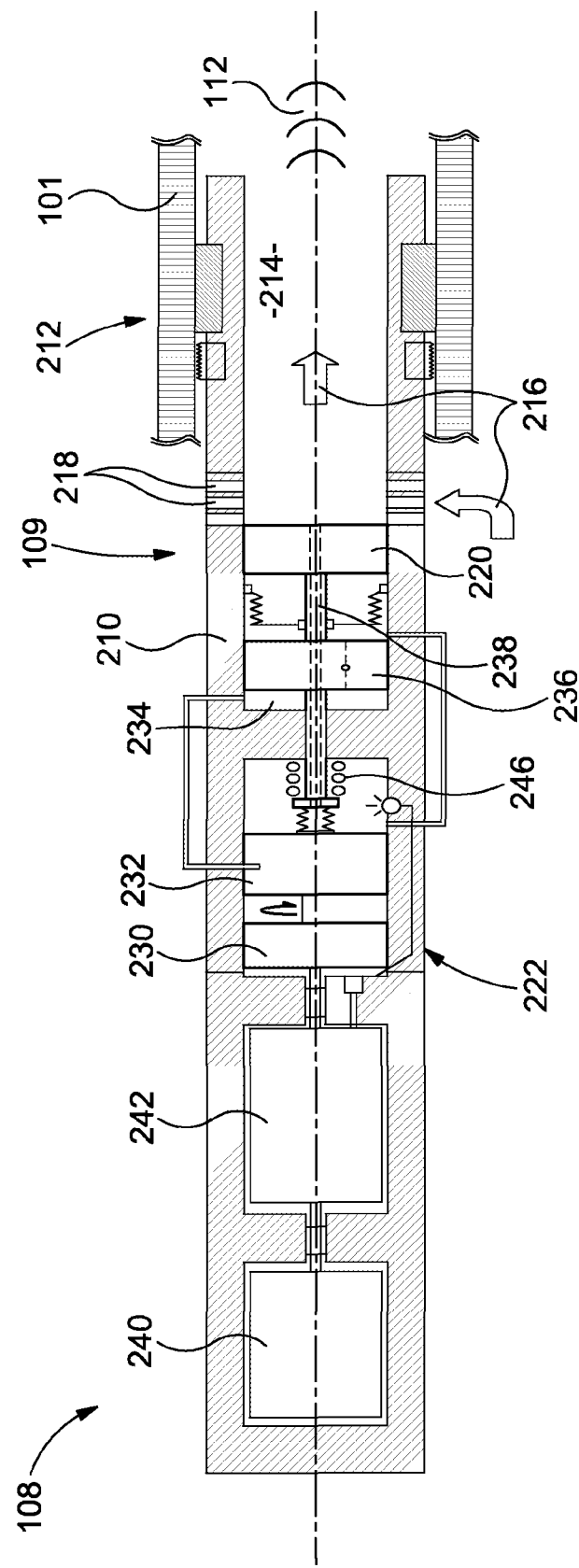
FIG. 3 illustrates an exemplary embodiment a flow control device which is used for wireless communication within a wellbore.

Reference is now made to FIG. 3 in which there is shown one embodiment of a flow control device or system 108 which may be used to monitor downhole conditions, such as pressure and temperature data, and transmit such data wirelessly to surface by means of imposing pressure pulses onto the flowing fluid in the well 101. The device 108 functions in a similar manner to that described in WO 2006/041308, the disclosure of which is incorporated herein by reference.

The device 108, which includes the choke/flow regulator valve or assembly 109, includes a housing 210 which is secured to the well/production tubing 101 by means of a packer arrangement 212. The packer arrangement 212 restricts the fluid flow 216, which can be both produced as well as injected fluids, along the tubing 101 causing flow through flow ports 218 formed in the wall of the housing 210 and into a flow path 214 which is in fluid communication with surface. A regulator assembly or element 220 is mounted within the housing 210 and is actuated to move by a drive arrangement 222 to vary the flow area through the ports 218 and into the flow path 214 to generate pressure based wireless signals 112 which are then transmitted via the fluid to surface.

The drive arrangement 222, which is also mounted within the housing, comprises an electric motor 230 which operates a pump 232 to displace a fluid to/from a piston chamber 234 in order to apply work on a drive piston 236 secured to the regulator assembly 220 via shaft 238.

A battery module 240 and an control/electronics module 242 are used to energise and control the operation of the device 108.

To transmit one single pressure pulse (negative pulse in this embodiment) the motor 230 is used to operate the pump 232 to pump fluid into a piston chamber 234 to cause the drive piston 236 and regulator assembly 220 (via shaft 238) to shift to the right in FIG. 3. This has the effect of reducing the flow area through the flow ports 218 thus choking the flow and generating a pressure drawdown downstream of the device 108. After having applied the required pressure amplitude (pressure drawdown) for a sufficient period of time to permit detection at surface, the motor 230 is reversed to offload fluids from the piston chamber 234. A spring 246 causes the regulator assembly 220 to retract and the production returns to "normal", i.e. a fully open position.

Figure 4:
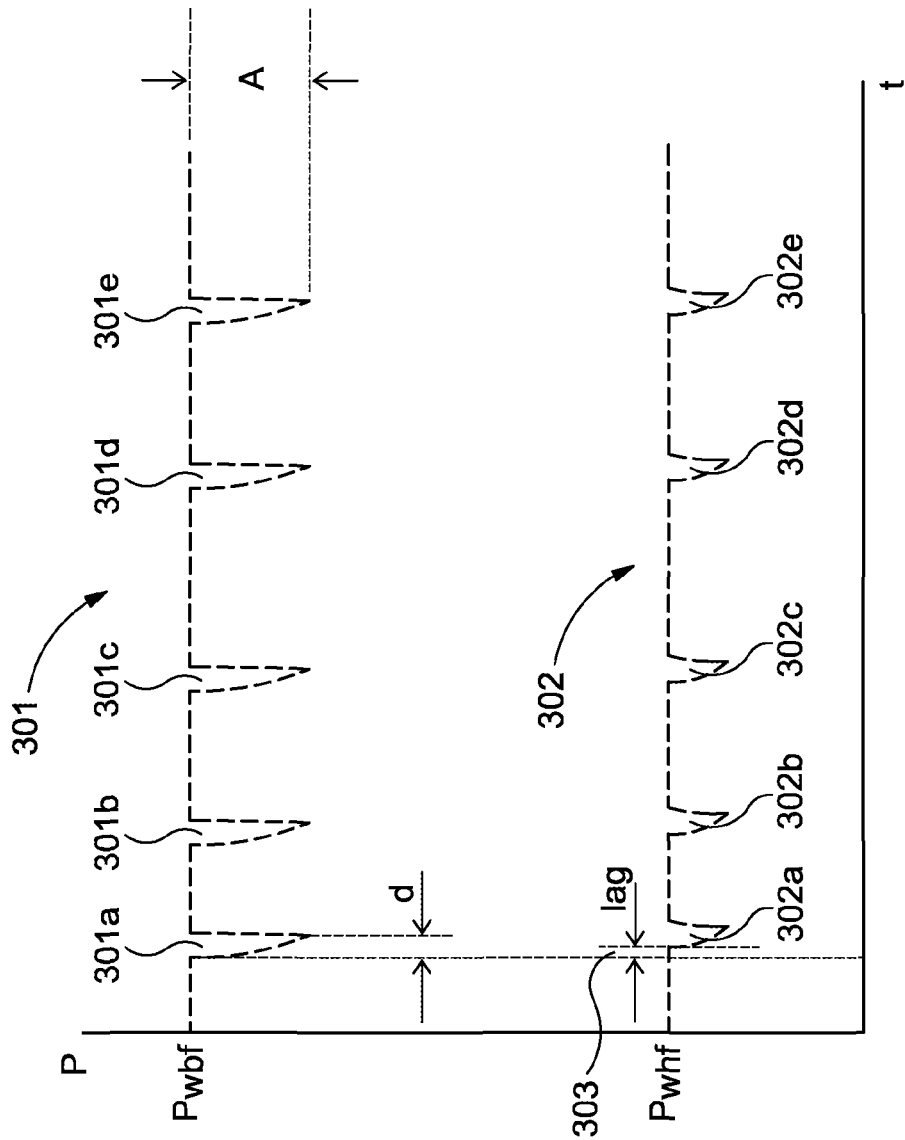
FIG. 4 illustrates example transmitted and received pressure based signals.

FIG. 4, which is a plot of pressure vs time, illustrates a characteristic signal transmission sequence which may be achieved by appropriate use of the flow control device 108, in accordance with the present invention. Selectively restricting the flow ports 218 may establish a signal pattern 301 which comprises a set of generated pressure fluctuations, or pulses 301a-301e which are composed to represent appropriate data to be transmitted. The pulses 301a-301e are provided by variations from a baseline pressure $P_{wbf}$, which is the pressure within the wellbore when flowing without restriction imposed by the device 108. Each pulse 301a-301e comprises particular signal parameters including a duration or pulse width d and an amplitude A. The time lapse between sequential pulses 301a-301e may be defined as a pulse separation, or frequency. This pulse separation may be of importance in embedding appropriate data. For example, the pulse separation may be selected to be representative of a digitised data format. It is vital that the signal pattern 301 is detectable at surface, and the present invention achieves this by selection of appropriate signal parameters, including pulse width d and/or amplitude A, which will be discussed in more detail below.

When appropriate signal parameters are selected a received signal pattern 302 will be detected at surface, with an appropriate time lag 303. The received signal will comprise individual pulses 302a-302e which can be appropriately processed to extract the embedded data.

As noted above, the present invention provides a signal which will be capable of being detected at surface, or any other intended point of reception. In accordance with one embodiment of the present invention correct parameters for amplitude and duration may be achieved by means of a software simulation up-front any installation in the well.

Further, the device or system 108 (FIG. 1) may be programmed with a parameter matrix, and change amplitude A and duration d according to read downhole parameters, read by systems sensors such as pressure sensors, flow sensors and phase composition and/or density sensors.

Figure 5:
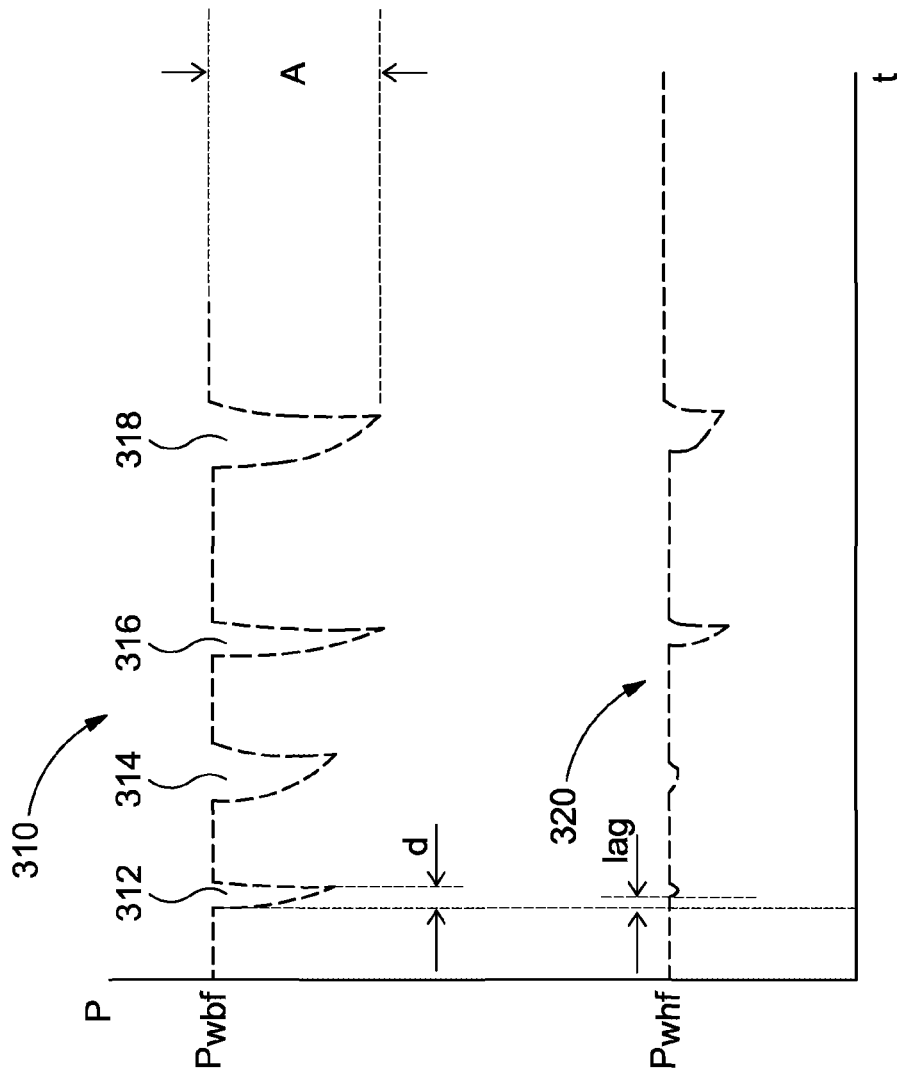
FIG. 5 illustrates a method for optimising signal transmission.

FIG. 5, which is also a plot of pressure vs time, illustrates another method according to an embodiment of the present invention for providing an optimised signal. The method comprises sending a trial signal 310 which may include a number of trial pulses 312, 314, 316, 318 which each comprise different signal parameters, specifically pulse width d and amplitude A. Although single pulses are provided, a plurality of pulses may be transmitted with one set of signal parameters, then a plurality of pulses with a different set of signal parameters, and so on. Further, each illustrated individual pulse may represent an entire test signal, such that in the embodiment shown in FIG. 5 four test signals 312-381 are presented. A receiver at a target location, such as surface level, is operated to detect a received signal 320 which corresponds to the transmitted test signal. Upon analysing the received signals 320, the optimal amplitude A and/or duration d may be determined. This can then be communicated to the downhole device 108 (FIG. 1) by means of surface to downhole wireless communication, or by means of alternative actions such as shutting in the well for a predetermined amount of time.

In addition to this, the present invention permits other intelligence to be accounted for. For example, excessive choking of the well is generally to be avoided as this may otherwise entail unwanted disturbances to the production flow. Further, as the well gets older, the pressure conditions and fluid regime may change, due to a decline in reservoir pressure. Embodiments of the present invention permit optimal signalling (for example in order to achieve the correct amplitude A and/or pulse width d) by applying intelligence to the transmission system. Specifically, embodiments of the present invention permit condition changes within the wellbore 101 (FIG. 1) to be recognised and the flow control device 108 controlled accordingly to adapt the signals to the changing conditions. This is described in more detail below.

Figure 6:
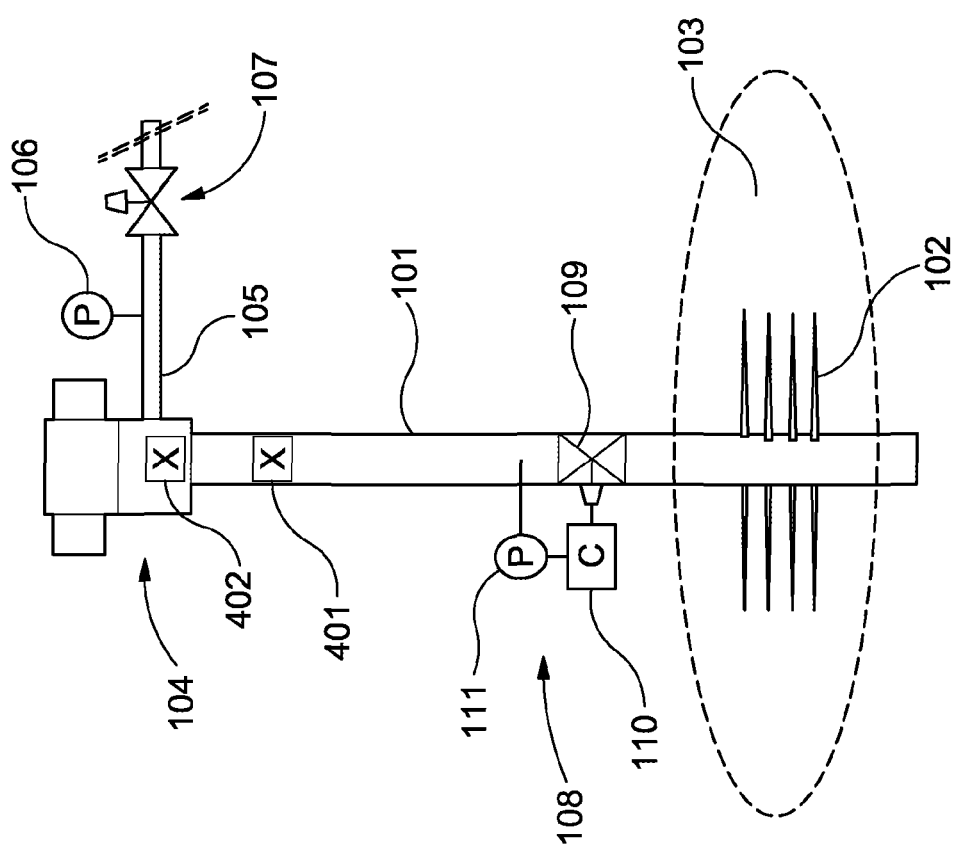
FIG. 6 is a diagrammatic illustration of a wellbore arrangement which is subject to a shut-in procedure.

FIG. 6 illustrates the same well 101 as presented in FIG. 1, with one exception: in FIG. 6 the well 101 is not producing. That is, the well 101 is shut-in such that there is no flow. By closing valves such as a downhole safety valve 401 and wellhead valve(s) 402 the production from the well 101 can be stopped. This may be required in cases of emergency, but shutting wells in is also very common for other reasons such as:

testing—performing so-called pressure build-up (PBU) tests is common in order to acquire data that can be interpreted to yield important information about the well 101 and/or the reservoir 103;

maintenance—wells are commonly shut-in to permit in-well maintenance or other maintenance, for instance on the production facility;

production stop due to the introduction of or excess of unwanted fluids such as water.

The device or system 108 is designed to transmit signals through the producing fluid, hence signalling is not possible when the well 101 is shut in. As will be described in more detail in the following sections, embodiments of the present invention permit a recognition of changing conditions within the well, which may be indicative of a specific event, such as shut-in, with changes to the operational modus of the device 108 being made accordingly. For the shut-in well scenario, such change does in one embodiment imply a stop in the signalling activity to avoid wasting system power, as signalling is not possible due to the halt in fluid movement.

Figure 7:
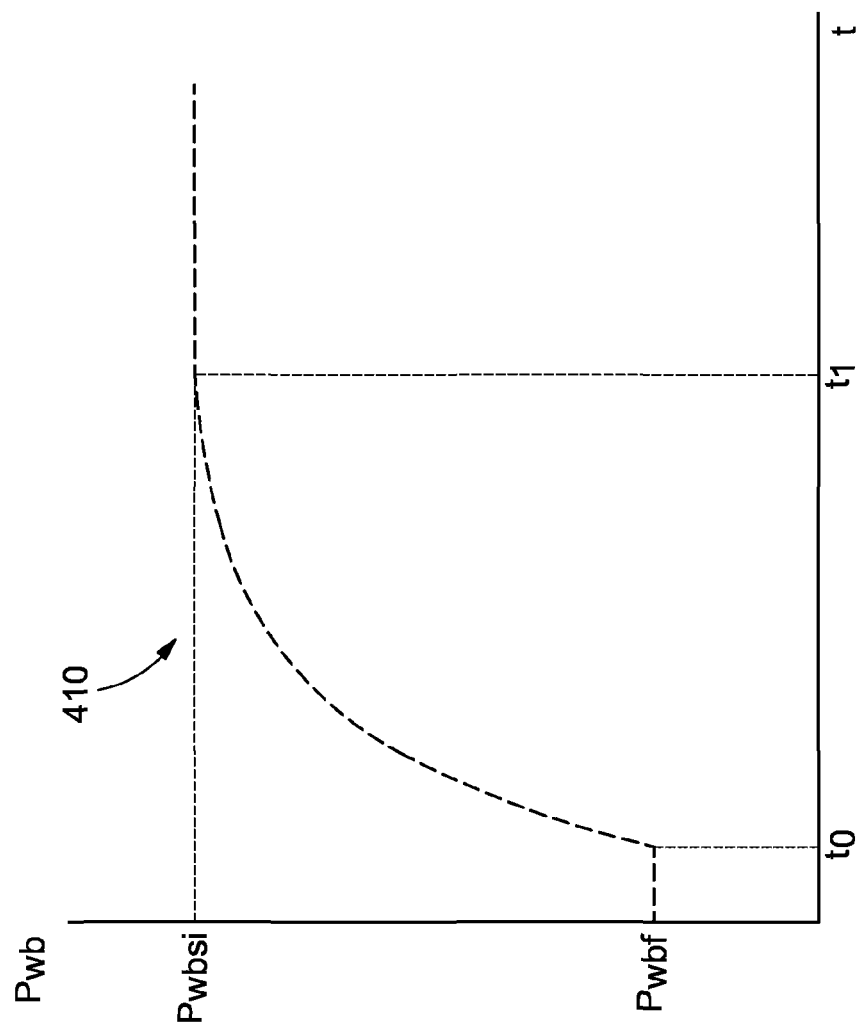

FIG. 7 illustrates a typical pressure build-up (PBU) curve 410, i.e. the downhole pressure trend when going from a production modus to a shut-in modus of the well. Time is used as the reference along the x-axis and $P_{wb}$, a short-name for wellbore pressure, is plotted along the y-axis. When the well is flowing, $P_{wb}$ equals the value $P_{wbf}$ i.e. the flowing wellbore pressure. At time $t_0$, the well is shut in. Gradually, the pressure $P_wb$ rises to a maximum wellbore pressure $P_{wbsi}$ at time $t_1$. In many cases, it is of great interest to know the value of the maximum wellbore pressure $P_{wbsi}$.

In order to store and subsequently report the value $P_{wbsi}$, the downhole device or system 108 recognises the fact that the well is being shut in. One method to achieve this is to transmit a wireless message from the surface beforehand or at the time of shutting in the well, informing the downhole device(s) that this is the case. However in some cases that may not be possible due to a lack of signalling systems on surface or other reasons.

Figure 8:
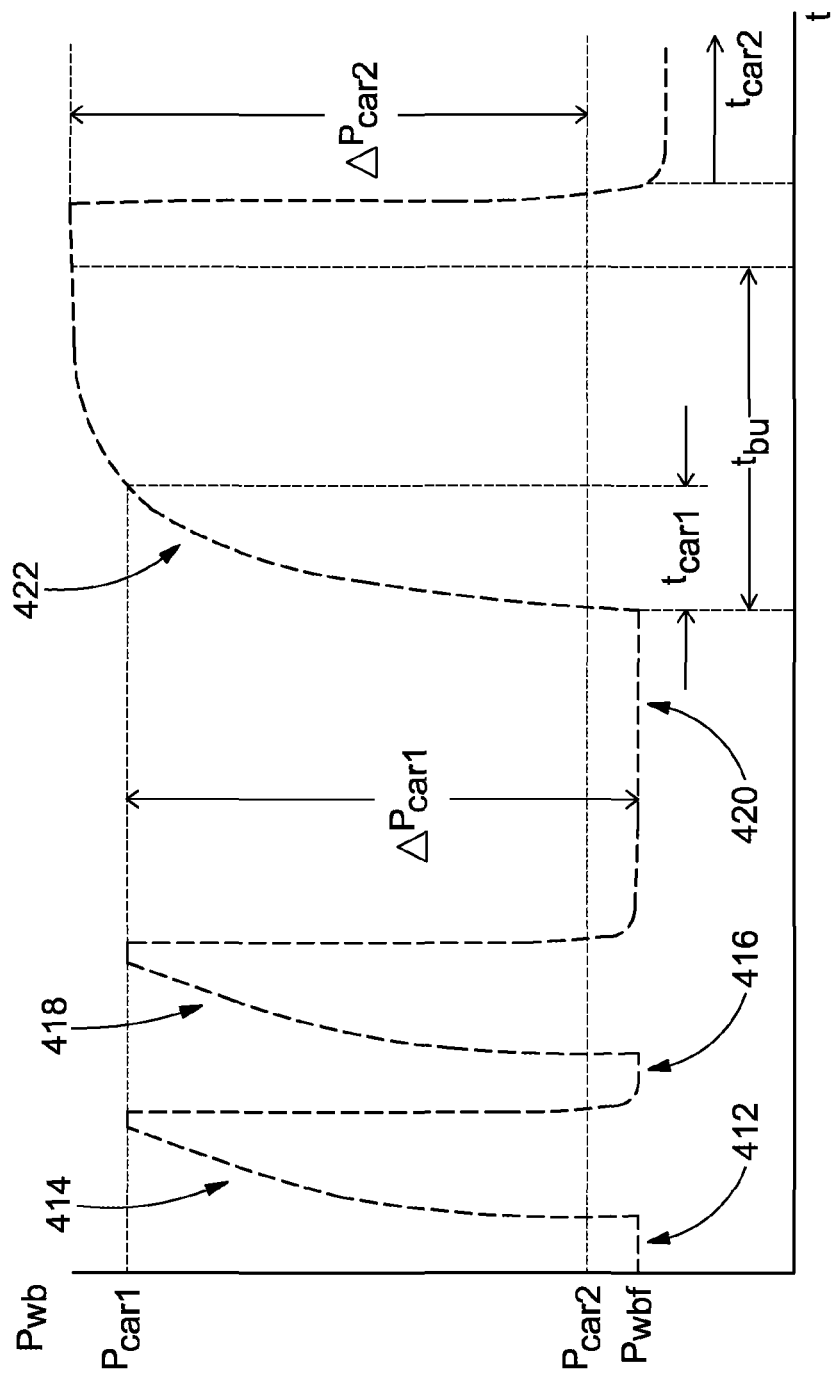
FIG. 8 illustrates exemplary wellbore pressure trends associated with some wellbore operations.

FIG. 8 shows aspects related to one embodiment of the present invention, further to a scenario where the downhole device or system 108 is configured to perform a self-assessment and correct behaviour subsequent to recognised wellbore changes. FIG. 8 illustrates pressure changes which may be typical within a wellbore. The given trend starts in a time period 412 where the well of this example is producing. In conjunction with the installation of an autonomous downhole tool, such as the device 108 described herein, the well is shut-in for the job of installing the system. The first pressure build-up profile 414 shows a typical pressure path when the well is shut-in for a short period of time (related to rigging up and installing the downhole equipment). The first pressure build-up profile 414 is normally followed by a short period of producing the well 416 to verify that all downhole components are working satisfactorily. Upon verification, the well is shut-in a second time in order to rig down relevant intervention equipment such as pressure control equipment associated with a wireline operation. This stage is associated with pressure trend 418. Thereafter, the well is put on normal production 420, which may last for a prolonged period of time.

After some time of production, the well is shut-in in order to perform a shut-in test. When shutting in, a profile such a pressure trend 422 is experienced. This typically has a longer duration than the shut-in periods that are associated with the installation work 414, 418, and as a consequence, the pressure increase is higher as pressure effects from more remote reservoir segments will be experienced in the wellbore, for example.

The present invention operates, or permits operation of the downhole device or system 108 in accordance with a number of desires, including:

the system should not spend energy on attempting to send data during a shut-in period;

the system should preferably record representative shut-in data, such as the pressure value at the time of shutting in the well;

the system should transmit the recorded data to surface when production is started again;

the system should preferably not transmit shut-in data recorded during short periods of shutting in the well such as the periods described by the two first pressure trends 414, 418—these periods may be too short to provide for useful representations of shut-in data.

In one embodiment of the invention, the tool is programmed to recognise a true shut-in period 422 by monitoring pressure differences versus time. A true shut-in period 422 is defined by a certain pressure increase $\Delta P_{car1}$ taking place. As this may also be the case in other, smaller shut-in periods 414, 418 where data acquisition may not be of interest, a true shut-in period 422 may also be defined by a characteristic time factor $t_{car1}$, i.e., if a pressure increase further to $\Delta P_{car1}$ is experienced, and sustained for a time period longer than a time equal to $t_{car1}$, then a real shut-in period 422 is recognised as taking place. Upon recognising this, the tool starts to sample pressure data at regular time intervals, and in a preferred embodiment, the device 108 transmits the last recorded build-up pressure when the production is started again, after a certain time of stabilisation.

Typically, a representative pressure data such as the pressure in place at $t=t_{bu}$ is recorded and subsequently reported to the surface, after the production is initiated again. Normally, the further into the pressure build-up period 422, the more representative the data will be. Therefore, the device 108 will record shut-in data continuously, and transmit the last recorded representative value after the production has started again.

In the same manner, the device can be programmed to identify the time of starting the production again after a time of shutting the well in. As shown in FIG. 8, this can be performed by recognising a pressure drop $\Delta P_{car2}$ and this being sustained or exceeded for a period of $t=t_{car2}$.

At the initiation of the production after shut-in period 422, some pressure disturbance may be experienced. To avoid recording and transmitting pressure data from that period (such data may be faulty and not represent the shut-in period), reverse time lags may be added to the procedure. As an example, the device 108 may be programmed to transmit the last data recorded up to a minimum of 2 hours prior to a recognised production start-up.

In one embodiment, the device 108 is capable of making a mathematical representation of the pressure trend 422, and transmit a digital representation of the mathematical representation to the surface. This may compensate for bandwidth and energy usage problems related to transmitting a large amount of datapoints representing the same curve. The mathematical representation could be created by transmitting the constants of an mathematical equation, i.e., numerical analysis of the data, or by comparing the recorded curve form with template curves in a library, transmitting the characteristic number for the best match curve, together with required absolute values.

Figure 9:
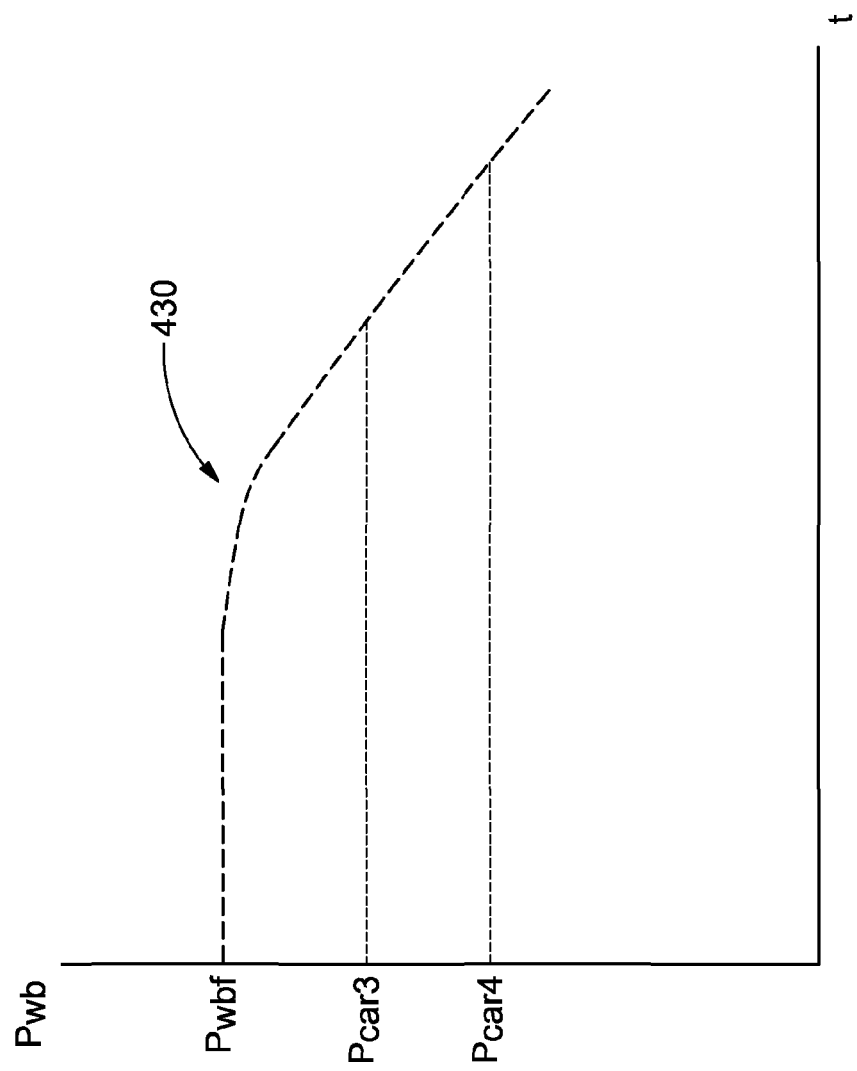
FIG. 9 illustrated changing pressure conditions within a wellbore over time.

FIG. 9 illustrates another aspect related to the advantages of the present invention in being capable of recognising condition changes within a wellbore and adapting accordingly. A typical pressure trend 430 is illustrated which represents a well falling off plateau production. Plateau is defined as a production rate when the well provides equal to or more fluids than the production facility can accept. When wells have drained the reservoir segment for a longer period of time, it is quite common that the downhole pressure drops. This pressure drop may be associated with changes in the fluid flow rate, and to the fluid composition, possibly due to free gas being released from the oil, or the commencement of water production from aquifers or water injection wells. The present invention permits recognition of such changing conditions and controls the device 108 to correct its behaviour further accordingly. For example, if the device 108 reads a wellbore pressure equal to or lower than $P_{car3}$, it may change settings related to pulse duration d and amplitude A of the transmitted pressure pulse signals (see, for example, FIG. 4) as well as settings related to the recognition of a pressure build-up and associated production start event. A similar new change may take place when the wellbore pressure goes below $P_{car4}$.

Figure 10:
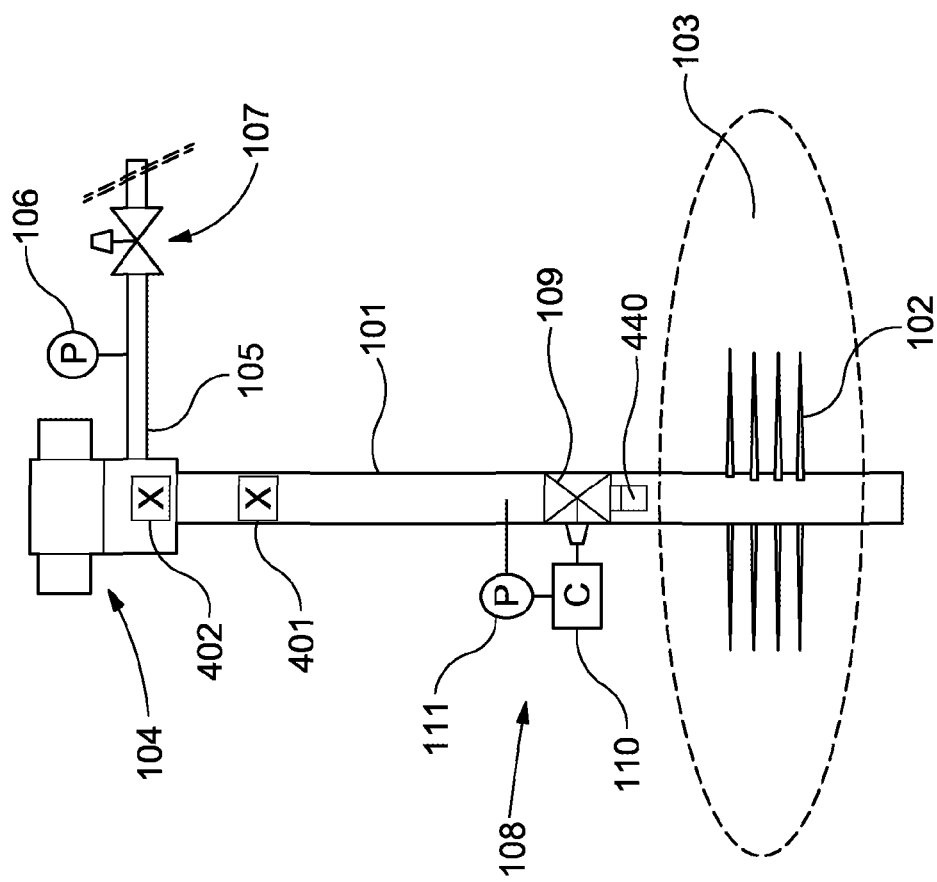
FIG. 10 is a diagrammatic illustration of a modified wellbore arrangement which is also subject to wireless communication of signals in accordance with a further embodiment of the present invention.

FIG. 10 illustrates another embodiment of the present invention. Specifically, FIG. 10 illustrates a wellbore 101 almost identical to that shown in FIG. 6, and as such like features are represented by like reference numerals, and only the differences will be highlighted. The downhole device 108 is equipped with (an) additional sensor(s) 440. This could be sensors for monitoring flow velocity, water cut, fluid density and other relevant downhole parameters. Following the same argumentation as for the previous figures; depending in recorded changes in the sensor(s) 440, the downhole device 108 may change its operating characteristics, this being characteristics such as;

amplitude and pulse width or duration of wireless signal pulses;

signal transmission frequency;

detection levels for recognising shut-in and production start events;

transmission of more/additional types of information, for example information on water-cut may identify when water is confirmed present;

changes in parameters for energy generation modules of the device 108.

in one or more embodiments of the invention, the additional sensor(s) 440 may fulfil more than one role in the system 108, such as;

propeller system used as status sensor for determining a shut-in period and/or flow sensor for sensing flow velocity and/or energy generator;

vibration based system (vortex shedding device or lift reversal device) used as status sensor for determining a shut-in period and/or flow sensor for sensing flow velocity and/or energy generator.

It should be understood that the embodiments described herein are merely exemplary and that various modifications may be made thereto without departing from the scope of protection. For example, the methods and devices described above may be utilised within any flowline, and are not restricted for wellbore use.

The invention claimed is:

1. A method for autonomously controlling communication from a downhole communication system located downhole within a production well, the downhole communication system including a monitoring system, a controller and a flow control device, wherein the method comprises:
   (i) obtaining data relating to at least one downhole parameter using the monitoring system;
   (ii) using the controller to operate the flow control device to impart a pressure based signal on production fluid flowing along a flowline within the production well such that the pressure based signal is transmitted through the flowing production fluid towards a receiver, the pressure based signal being representative of the data;
   (iii) regularly repeating steps (i) and (ii) to transmit multiple pressure based signals through the flowing production fluid;
   (iv) using the monitoring system and the controller to monitor for a condition change within the production well indicative of a flowline shut-in event by (a) measuring a wellbore pressure associated with the production well during normal production, (b) monitoring the wellbore pressure to determine if an increase in the wellbore pressure relative to the wellbore pressure during the normal production exceeds a threshold, (c) measuring a length of time the increase in the wellbore pressure exceeds the threshold, and (d) recognizing the flowline shut-in event in response to the length of time the increase in wellborn pressure exceeds the threshold being greater than a set characteristic time factor;
   (v) in response to recognising the flowline shut-in event, using the controller to control the flow control device to cease signal transmission through the production fluid and to measure the wellbore pressure during the flowline shut-in event and store at least a maximum value of the wellbore pressure during the flowline shut-in event;
   (vi) using the monitoring system and the controller to monitor for a condition change within the production well indicative of a flow initiating event; and
   (vii) in response to recognising the flow initiating event repeating at least steps (i) and (ii) and transmitting data indicating at least the maximum value of the wellbore pressure during the flowline shut-in event via the pressure based signal.

2. The method according to claim 1, wherein the downhole parameter is associated with at least one of the production fluid, the flowline, the flow control device and adjacent regions or components.

3. The method according to claim 1, wherein the pressure based signal comprises at least one pressure variation imparted within the production fluid by the flow control device.

4. The method according to claim 3, wherein the pressure based signal comprises or defines at least one signal parameter including at least one of amplitude, a pulse width and a pulse separation.

5. The method according to claim 1, wherein the flow control device is controlled to optimise the pressure based signal.

6. The method according to claim 5, wherein optimisation is achieved in terms of creating and/or maintaining an optimum pressure based signal which permits detection of the signal by the receiver.

7. The method according to claim 5, further comprising:
   modifying one or more parameters of the pressure based signal to optimise said pressure based signal.

8. The method according to claim 1, comprising:
   controlling the flow control device by modifying operational parameters stored within the flow control device.

9. The method according to claim 8, wherein the flow control device is operated in accordance with specific algorithms or protocols, wherein such algorithms or protocols are modified in accordance with a recognised condition change within the flowline.

10. The method according to claim 8, wherein the flow control device comprises a parameter matrix, and the method further comprises:
   modifying parameters within the parameter matrix in accordance with the condition change.

11. The method according to claim 1, wherein monitoring is provided by use of one or more sensors.

12. The method according to claim 11, wherein at least one sensor is provided exclusively for the monitoring.

13. The method according to claim 11, wherein at least one sensor is provided for both data collection to be transmitted and the monitoring.

14. The method according to claim 1, wherein the recognising comprises:
recognising at least one of a pressure condition change, a temperature condition change, a flow rate condition change and a fluid composition condition change.

15. The method according to claim 1, further comprising:
determining or composing an optimised signal for detection at a remote location; and
transmitting said optimised signal using the flow control device.

16. The method according to claim 15, further comprising:
composing or determining an optimised pressure based signal in accordance with a simulation associated with the flowline.

17. The method according to claim 15, further comprising:
composing or determining an optimised pressure based signal by transmitting one or more test signals.

18. The method according to claim 15, further comprising:
transmitting a plurality of pressure based test signals;
receiving at least one of the pressure based test signals at the receiver;
determining or selecting an optimal signal from the received pressure based test signals; and
transmitting a determined or selected optimal pressure based signal through the production fluid within the flowline.

19. The method according to claim 18, wherein
the receiving at least one pressure based test signal includes receiving a plurality of pressure based test signals at the receiver, and
the determining or selecting determines or selects an optimal pressure based signal from the received pressure based test signals.

20. The method according to claim 18, wherein the least one pressure based test signal includes two or more pressure based test signals composed with at least one different signal parameter.

21. The method according to claim 18, further comprising:
communicating a positive determination of an optimal pressure based signal from the receiver to the flow control device.

22. The method according to claim 21, wherein the communicating comprises:
communicating a positive determination by wireless transmission of the determined optimal pressure based signal.

23. The method according to claim 21, wherein the communicating comprises:
communicating a positive determination by performance or initiation of a recognisable event within the flowline, such as a shut-in event.

24. A downhole communication apparatus for autonomous communication from a downhole location within a production well, the downhole communication apparatus comprising:
a monitoring system configured to obtain data relating to at least one downhole parameter;
a flow control device configured to impart a pressure based signal on production fluid flowing along a flowline within the production well such that the pressure based signal is transmitted through the flowing production fluid towards a receiver; and
a controller configured to receive the data from the monitoring system and operate the flow control device based on the data from the monitoring system by,
monitoring for a condition change within the production well indicative of a flowline shut-in event by (a) measuring a wellbore pressure associated with the production well during normal production, (b) monitoring the wellbore pressure to determine if an increase in the wellbore pressure relative to the wellbore pressure during the normal production exceeds a threshold, (c) measuring a length of time the increase in the wellbore pressure exceeds the threshold, and (d) recognizing the flowline shut-in event in response to the length of time the increase in wellborn pressure exceeds the threshold being greater than a set characteristic time factor,
in response to recognising the flowline shut-in event, controlling the flow control device to cease signal transmission through the production fluid and to measure the wellbore pressure during the flowline shut-in event and store at least a maximum value of the wellbore pressure during the flowline shut-in event,
monitor for a condition change within the production well indicative of a flow initiating event, and
in response to recognising the flow initiating event, operate the flow control device to reinitiate pressure based signal transmission through the flowing production fluid towards the receiver and transmit data indicating at least the maximum value of the wellbore pressure during the flowline shut-in event via the pressure based signal.

* * * * *